US010365293B2

(12) United States Patent
Williams

(10) Patent No.: US 10,365,293 B2
(45) Date of Patent: Jul. 30, 2019

(54) MONITORING THE STRUCTURAL HEALTH OF COLUMNS AND LIKE STRUCTURES

(71) Applicant: THE ALUMINIUM LIGHTING COMPANY LTD, Wales (GB)

(72) Inventor: Craig Thomas Williams, Wales (GB)

(73) Assignee: THE ALUMINIUM LIGHTING COMPANY LTD, Port Talbot, Wales (GB)

( * ) Notice: Subject to any disclaimer, the term of this patent is extended or adjusted under 35 U.S.C. 154(b) by 0 days.

(21) Appl. No.: 15/871,899

(22) Filed: Jan. 15, 2018

(65) Prior Publication Data

US 2018/0156837 A1   Jun. 7, 2018

Related U.S. Application Data

(63) Continuation-in-part of application No. 15/841,108, filed on Dec. 31, 2017, now Pat. No. 10,203,349, (Continued)

(30) Foreign Application Priority Data

Jul. 1, 2014  (GB) .................................... 1411694.1
Jun. 22, 2015  (WO) ................ PCT/GB2015/000191
(Continued)

(51) Int. Cl.
*G01P 5/02* (2006.01)
*G01P 15/14* (2013.01)
*G01S 19/01* (2010.01)
*G01N 35/00* (2006.01)
*G08C 17/02* (2006.01)
(Continued)

(52) U.S. Cl.
CPC ................ *G01P 5/02* (2013.01); *G01P 15/14* (2013.01); *G01S 19/01* (2013.01); *G08C 17/02* (2013.01);
(Continued)

(58) Field of Classification Search
CPC combination set(s) only.
See application file for complete search history.

(56) References Cited

U.S. PATENT DOCUMENTS 9,880,190 B2    1/2018  Williams
2009/0034258 A1  2/2009  Tsai et al.
(Continued)

FOREIGN PATENT DOCUMENTS

CN    202364425 U    8/2012
CN    202647515 U    1/2013
(Continued)

*Primary Examiner* — Jewel V Dowtin
(74) *Attorney, Agent, or Firm* — Merchant & Gould P.C.

(57) ABSTRACT

Apparatus for monitoring the structural health of a column or a stock of columns or a column or columns within that stock is disclosed in the application. The apparatus comprises a microcontroller located on the or each column which includes an integrated MEMS device programmed to measure and record accelerations, angular velocities and magnetic field strengths in X, Y and Z axes. The apparatus includes means for connecting said microcontroller to a source of power, and means operable to transmit said measured data to a central data hub and from there to a remote server for analysis using bespoke software.

12 Claims, 1 Drawing Sheet

Related U.S. Application Data which is a continuation of application No. 15/322,090, filed as application No. PCT/GB2015/000191 on Jun. 22, 2015, now Pat. No. 9,880,190.

(30) Foreign Application Priority Data

| | | |
|---|---|---|
| Mar. 1, 2016 | (GB) | ................................ 1603561.0 |
| Feb. 28, 2017 | (WO) | ............... PCT/GB2017/000029 |

(51) Int. Cl.
  *H05B 37/03* (2006.01)
  *H04Q 9/00* (2006.01)

(52) U.S. Cl.
  CPC ............... *H04Q 9/00* (2013.01); *H05B 37/03* (2013.01); *H04Q 2209/86* (2013.01)

(56) References Cited

U.S. PATENT DOCUMENTS

| | | |
|---|---|---|
| 2010/0271199 A1 | 10/2010 | Belov et al. |
| 2014/0211487 A1 | 7/2014 | Spiro |
| 2014/0278150 A1 | 9/2014 | Baesler et al. |
| 2014/0316708 A1 | 10/2014 | Mollineaux et al. |
| 2017/0138978 A1* | 5/2017 | Williams ............ H05B 37/0272 |

FOREIGN PATENT DOCUMENTS

| | | |
|---|---|---|
| CN | 102944889 A | 2/2013 |
| CN | 203673783 U | 6/2014 |
| CN | 203884050 U | 10/2014 |
| GB | 2498793 A | 7/2013 |
| JP | 2004125776 A | 4/2004 |
| KR | 20090108967 A | 10/2009 |
| KR | 101040215 B1 | 6/2011 |
| KR | 20120093741 A | 8/2012 |
| WO | 2009131389 A2 | 10/2009 |
| WO | 2011142516 A | 11/2011 |
| WO | 2011149974 A1 | 12/2011 |
| WO | 2013007382 A | 1/2013 |
| WO | 2014078907 A | 5/2014 |
| WO | 2015022213 A | 2/2015 |
| WO | 2015077297 A1 | 5/2015 |
| WO | 2015077626 A1 | 5/2015 |
| WO | 2016001614 A2 | 1/2016 |

* cited by examiner

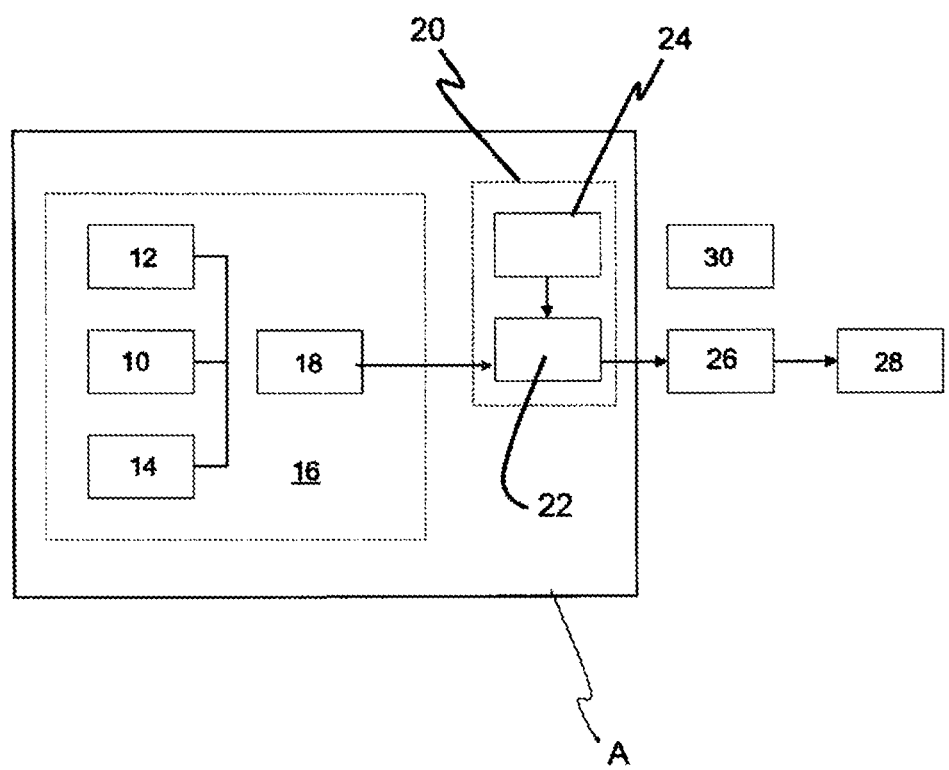

MONITORING THE STRUCTURAL HEALTH OF COLUMNS AND LIKE STRUCTURES

CROSS REFERENCE TO RELATED APPLICATION

This application is a a continuation-in-part application of U.S. patent application Ser. No. 15/841,108 filed Dec. 13, 2017, entitled "MONITORING THE STRUCTURAL HEALTH OF COLUMNS" which is a continuation application of U.S. patent application Ser. No. 15/322,090 filed Dec. 23, 2016, entitled "MONITORING THE STRUCTURAL HEALTH OF COLUMNS," which is a U.S. national phase entry of PCT Application No. PCT/GB2015/000191 filed Jun. 22, 2015, which claims priority to GB Patent Application No. 1411694.1 filed Jul. 1, 2014, each of which is incorporated herein by reference in its entirety for all purposes.

This application is also a continuation-in-part application of PCT Application No. PCT/GB2017/000029 filed Feb. 28, 2017, entitled "MONITORING THE STRUCTURAL HEALTH OF COLUMNS AND LIKE STRUCTURES," which claims priority to GB Patent Application No. 1603561.0 filed Mar. 1, 2016, each of which is incorporated herein by reference in its entirety for all purposes.

FIELD OF INVENTION

The present invention relates to a method and apparatus for monitoring the structural health of a column or a stock of columns, masts, pylons, poles and other supporting structures (all collectively referred to below as «columns»).

In a preferred arrangement, the invention relates to a method and apparatus for monitoring the structural health of a column or stock of columns or columns within that stock which supports or support electrical devices such as lighting units, inspection cameras, signage, illuminated traffic signs and luminaires.

Thus, in the context of the invention, the term «columns» includes inter alia masts including telecom masts, pylons, poles, railway signals, gantries, bridges, CCTV installations, weather masts, chimneys, wind turbines, power distribution masts, pylons, support structures for rail electrification equipment and any like ground supported structure which in use is subject to vibration and weather changes.

By "stock" is meant a plurality of columns located in a specific geographical location or area and subject to the same or similar climatic conditions. This definition includes a plurality of columns such as lighting columns located within an administrative area. A "stock" may comprise large numbers of columns all located in a given geographical location or locations.

In a preferred embodiment, the present invention relates to an improved method and apparatus for monitoring the structural health of a stock of columns to the method and apparatus disclosed in our earlier patent application GB1510918.4.

BACKGROUND TO THE INVENTION

As explained in our earlier application, local authorities and highways agencies routinely test lighting and other columns to check their ability to withstand wind loads and/or reduced structural integrity through, for example loss of column wall section caused by corrosion. Tests are also routinely conducted for electrical and defects.

Structural tests include applying an artificial load to a column and measuring deflection, ultrasonic measurement of the wall section of a column and systems using eddy currents to determine the level of corrosion and resulting loss of wall section. Electrical tests are conducted to ensure that the electrical supply to a column is correctly maintained and that the lighting column is safe to the public.

Examples of known structural test systems and methods are disclosed in WO11142516A, US2009/034258A, US2014/0211487A, WO2014/078907A, WO2015/022213A, WO2013/007382A, JP2004125776A, US2009/034258A, GB2498793A and CN102944889A, KR2009/0108967A, KR2012/0093741A, KR101040215B.

Whereas these and other currently available methods may be able to provide accurate data and forecasted serviceable lifespans for individual columns, none discloses a method in which measurements of imposed accelerations, angular velocities and magnetic field strengths are taken and transmitted to a remote server for analysis using bespoke software. In this way the health of a column or a stock of columns can be constantly measured and remedial action taken to make safe any column found to be requiring repair or replacement. Thus an organisation responsible for a stock of columns of say 100 columns, or a multiplicity of such stock, can remotely check the health of each column or that stock or stocks and take immediate action to remedy any fault found by a site visit.

No method known to the Applicant provides a method which enables a user to check the integrity of a column stock remotely and to respond immediately to a problem occurring with a column which forms part of a stock of such columns through a subsequent site visit.

A further major disadvantage of all existing systems known to the Applicant is that all require a decision to be made concerning the number of columns within a stock to be tested and to what frequency that testing should be undertaken.

Thus, only selected columns within a stock are regularly or irregularly tested. Testing programs that are set up employing such systems are inevitably not able to take into account localised wind loads or ground conditions or electrical component failure.

Although column manufacturers are required to provide a minimum design life of twenty five years there are numerous cases where a column's serviceable life is far less, due to column design and/or localised conditions that are more aggressive than otherwise anticipated.

It can also be the case that the actual installed age of a column is not documented which means that a column could at any given time be past its projected design life.

Due to years of underfunding in infrastructure, stocks of lighting columns have frequently been found to include significant numbers of columns that are past their design life and therefore need to be tested to ensure they are structurally and electrically safe within the public domain. Unfortunately there have been cases of catastrophic failure, some of which have caused injury and even death.

A further disadvantage of known testing methods is that these generally require an operative to visit the installation and verify the structural health and electrical operation of a column. This can be a costly exercise in terms of testing administration and road traffic management. There is also an increase in risk to operatives while testing is carried out. This is particularly the case where the testing site is in a hazardous location such as, for example, on central reservations of motorways.

In common with our earlier application, the present invention seeks to provide inter alia an improved method and apparatus for monitoring the structural health of a column or stock of columns or individual columns within that stock that overcomes or at least alleviates problems associated with known methods and apparatus by providing monitoring equipment for location on and for connection to the power source of one or a plurality of columns of a stock of such columns, said monitoring equipment being operable to capture data relevant to the structural health of the columns being monitored and to transmit said data in real time to a remote server for analysis by bespoke software.

The present application also seeks to provide an improved method and apparatus for monitoring the electrical operation of a stock of such columns by providing that the electrical operation of the column stock is also monitored through the capture of data relevant to said electrical operation, this data also being transmitted in real time to a remote server for analysis by bespoke software.

The present invention is distinguished over the disclosure of our earlier application in that it provides a method of and apparatus for evaluating the structural health of a stock of lighting or like columns by means of a statistical analysis of dynamic and vertical deflection data measurements taken in X, Y and Z axes by means of column mounted microcontroller which includes a micro-electro-mechanical system device (hereinafter referred to simply as «MEMS» device) having a nine degree of freedom function.

To measure the operational voltages and currents, the microcontroller may also include means to measure the electrical parameters of electrical equipment supported by the column.

In the present invention, each MEMS device comprises an integrated unit having accelerometer and gyroscope functions each able to take the required vertical deflection data in the aforementioned X, Y and Z axes of the respective column and to transfer the collected data via a column mounted transmitter or communication module and central data hub including an internal connection to a remote server for analysis using bespoke software.

If each microcontroller includes means to measure electrical voltages and currents of electrical appliances supported by each said column, then such measurements are included in the data transferred to the remote server.

SUMMARY OF THE INVENTION

In one aspect, the invention provides apparatus for monitoring the structural health of a column or a stock of columns or a column or columns within that stock, the apparatus comprising a microcontroller located on the or each column and including an integrated MEMS device programmed to measure and record accelerations, angular velocities and magnetic field strengths in X, Y and Z axes, means for connecting said microcontroller to a source of power, and means operable to transmit said measured data to a central data hub and from there to a remote server for analysis using bespoke software.

The MEMS device of the or each microcontroller may further comprise a magnetometer function.

The means operable to transmit said measured and recorded data to the remote server may comprise a WI-FI/RF transmitter or a 3G/4G component.

The means operable to transmit said measured and recorded data may comprise a wireless transmitter connected to receive data from a column mounted global positioning component.

The micro-controller also includes an electrical surge protector and photo cell.

The photo cell may be programmed to detect the presence or lack of daylight in the vicinity of said stock and to switch off/on the supply of electrical power to lighting units supported by the column stock depending on whether there is/is not daylight in the vicinity of the stock.

Anemometers may be positioned on an upper surface of the column or each column or a plurality of columns within the stock, the or each such anemometer being connected to enable measurements of wind velocity and direction to be transmitted to the remote server.

In another aspect the invention provides apparatus for measuring the structural health and electrical operation of a column or stock of columns and/or columns within that stock, the apparatus comprising a microcontroller including an integrated MEMS device for location on an upper surface of each or a plurality of columns within the stock to be monitored and connectable to a power supply, each MEMS device comprising accelerometer, gyroscope and magnetometer functions each able to measure and record deflections in X, Y and Z axes and to transmit recorded data to a column mounted monitor which is, in turn, connected to transmit recorded data to a column mounted wireless transmitter from which the measured data is transmitted to a remote server for analysis using bespoke software.

The microcontroller may also include means operable to measure the voltage and current parameters of electrical appliances supported by said column or columns within said stock of columns.

In a further aspect, the invention provides a method of monitoring the structural health of a column or a stock of columns or a column within that stock, the method comprising the steps of locating on the or each said column an integrated MEMS device programmed to measure and record accelerations, angular velocities and magnetic field strengths in X, Y and Z axes, and transmitting such measured and recorded accelerations, angular velocities and magnetic field strengths to a central hub and from there to a remote server, and analysing said measured data received by said remote server using bespoke software to alert a user of the method to a fault detected in the or one of the monitored columns.

BRIEF DESCRIPTION OF THE DRAWINGS

The invention will now be described by way of example with reference to the accompanying diagrammatic drawing in which FIG. 1 illustrates diagrammatically one embodiment of apparatus for measuring the structural health of a stock of lighting columns in accordance with the invention.

DETAILED DESCRIPTION OF PREFERRED EMBODIMENTS

The monitoring apparatus illustrated in FIG. 1 comprises a microcontroller 10 including a MEMS device located on an upper surface of one or all lighting columns of a stock of such columns whose structural health and electrical operation is to be monitored.

The microcontroller 10 is preferably powered by the electrical supply to the lighting column on which the device is located and comprises accelerometer, gyroscope and a magnetometer functions each able to make measurements in the X, Y and Z axes thereby defining a nine degree of freedom. The magnetometer function provides data concerning the geographical position and elevation of the microcontroller 10.

The micro controller may alternatively be powered by a source of electrical power independent of the mains supply to the column The microcontroller 10 is connected to transmit the measured data together with data received from a global geographical position and elevation module 12 and a microcontroller 14 to a transmitter module 18.

The microcontroller 10 including the MEMS device, the module 12 and the micro controller 14 all define components of an electronic chip or board which is housed in a monitor 16 connected to the source of electrical power.

Data retrieved from the microcontroller 10, the global position and elevation module 12 and the micro controller 14 is sent constantly or frequently by the transmitter module 18 to a second monitor 20 which comprises a central hub component 22 of an electronic chip or board 22.

The central hub component 22 includes an internet connection and receives data from an array of anemometers 24 positioned on the mast.

The central hub component 22 is connected to transmit data to a remote server 26 in which the received data is analysed together with further data as described below.

The monitor 16 including the microcontroller 10, the module 12 and the micro controller 14 is preferably located on all of the columns of a stock to be monitored, whereas the central hub 22 and anemometers 24 are preferably mounted on only one or a few columns within a stock of columns to be monitored.

The transmitter module 18 preferably comprises a WI-FI/RF transmitter component or a 3G/4G communication module operable to transmit data received from the microcontroller 10 including the MEMS device to the central hub 22 which in turn sends the received data including that received from the anemometers 24 to a remote server 26 for analysis.

The accelerometer component of the MEMS device of the microcontroller 10 provides a measure of the direction from which forces imposed on the column are derived.

The electrical operation of members supported by each column is derived from the measured voltages and currents. Thus, a photocell may be located within the monitor 16 to detect when a light supported by the column is ON or OFF and to send a signal to the central hub 22 when, for example, the light is inoperative.

The accelerometer function of the MEMS device of the micro controller 10 detects and monitors inter alia the magnitude and direction of vibrational forces imposed on the column during, for example, periods of high winds, and column motions caused by dynamic loading imposed by such forces and to provide data regarding such recorded forces and motions along the X, Y and Z axes.

The gyroscope function of the MEMS device of the micro controller 10 is employed to detect movements or deflections of the upper section of the respective column away from its normal vertical position and the directions of these movements. Thus, the gyroscope function will provide the angular rate of movements or deflections of inspected columns in the X, Y and Z directions in degrees. From this data accelerations in the X, Y and Z directions can be calculated.

The magnetometer function of the MEMS device of the micro controller 10 provides data concerning the heading and direction of structural deflections relative to the earth's magnetic north and provides a periodic self-calibration coordinate reference point for the system. Additionally, by referencing magnetic north any permanent deformation or rotation of the structure through, for example, vehicle collision, damage or the like can be detected.

The calculation and processing of dynamic acceleration, rotational and magnetic signals measured by the magnetometer function in X, Y and Z axes using a nine degree of freedom system enables deflections to be calculated to a predetermined accuracy.

Wind speed and direction are monitored via the anemometers 24 to enable correlation between deflection measurements and specific geographical wind conditions. This data is analysed to ensure that structure and deflections equate to those predicted for the specified measured wind load.

Furthermore this analysis provides valuable data to enable the user to differentiate between normal wind loading and excitation as a result of large vehicles such as heavy goods vehicles and trains passing by.

This localised wind data measurement will enable phenomena such as vortex shedding and wind funneling to be identified.

In the case of vortex shedding, correlation with the wind direction and the chip/node heading, with reference to magnetic north, will provide an indication of where the wind pressure is exerted on the structure or attachments such as lanterns. As vortex shedding causes the structure to deflect at right angles to the wind load, this potentially damaging phenomena can be identified. Therefore the system can differentiate between a reaction to vortex shedding through excessive deflection and excessive deflection due to damage e.g. corrosion and or fatigue.

The array of anemometers 24 is mounted on one or more columns of the stock, or at positions close to the columns, to measure wind velocity and direction. When column mounted, the array of anemometers is also powered by the electrical supply to the lighting columns on which they are located.

Because wind velocity and wind direction are generally similar in each geographical location, measurements from a single structure may be taken to apply to a group of columns.

This wind data is then captured by the central monitoring system or hub and transmitted to the remote server 26. In this way the structural health and electrical operation of the stock of columns can be continuously or periodically assessed and remedial action can then be taken should one or more of the column stock be found from the collected data to be in need of repair or replacement.

Baseline data relating to the specific structure and columns employed is entered into the remote server 26 for comparison with the measured performance values.

This Baseline data comprises performance boundaries of deflection and boundaries that align to common damage mechanisms (e.g. collisions, corrosion, tampering and the like) are set to comply to any applicable structural/national standards such as for example the European standard EN40. Deflection parameters are determined through structural calculations and/or finite element analysis particularly in the case of common damage mechanisms, such as a loss of section through corrosion and/or fatigue induced faults. The evaluation of structural health will follow from statistical analysis of live vibration data measurements utilising the above mentioned nine degree of freedom MEMS device.

Vibration characteristics are determined through structural calculations and/or finite element analysis particularly in the case of common damage mechanisms such as a loss of section through corrosion or fatigue induced faults.

All baseline data is calculated prior to the system installation in order that evaluation of the structural health can be undertaken without delay. Assessment of the structure can start immediately without the need for any prior knowledge of its current condition or age.

It is to be understood that the monitor 16 may be manufactured using several different product platforms. Thus an electronic board may be attached to the lighting CMS (Central Management System) module or may be formed as a separate module attached to the electronic board of the lamp or lantern of the lighting column.

In both cases the platforms are constructed to fit inside or closely adjacent to the lamp or lantern of the columns and utilise the lamp or lantern power source.

Further component options include a separate module fitted on the upper surface of the lamp or lantern, again utilising the lamp or lantern power source, or a separate module fitted on the upper surface of the structure.

Data collected by the remote server 26 includes, for example, the date and time of the data capture, the geographical position of the column and/or column stock from which the collected data originated, the elevation above sea level of the lighting column stock from which the data was collected, data relating to individual column identification, and the speed and direction of acceleration of the measured stock under measured wind loads and the electrical voltage and current.

In the arrangement described, all of the captured data is sent to and held within the remote server 26 where relevant data or extracts of the data can be viewed by authorised personnel by means of bespoke software through a web portal 28. In this way, a user of the described apparatus is enabled to be immediately aware of any physical or other problems occurring in an individual column of a column stock and to rectify any failures with immediate effect.

The structural deflection of the monitored columns during known wind loads is calculated through the data captured by the accelerometer function of the MEMS device of the micro controller 10. Thus, acceleration data received is, for example, integrated twice to provide deflection measurements in the X, Y and Z axes. The deflection can then be analysed against specific structural calculations for each column type.

Other methods for providing deflection and other data can be employed.

The electrical operation of the monitored columns can be assessed to determine if they are safe to the public and to anyone charged with their maintenance. Lighting columns that have electrical defects can be analysed to assess whether the lighting column presents any danger to the people working on or coming into contact with the lighting column and also to prove that on the day of any inspection or work to be carried out on the lighting column the installation is in a safe condition. Continuously monitoring the lighting column will also verify that the health and safety of persons, animals and property is not endangered.

An alert function 30 is provided to indicate that one or more columns of a stock is/are in an unsafe condition. This function may be predictive to indicate that one or more columns of a stock is/are likely to become unsafe within a predicted period of time.

Part of the analysis of the lighting columns electrical system is to determine the power factor which should preferably be maintained at 0.85 lagging or above. If the power factor is below 0.85 then components within the electronic circuitry may need to be replaced.

It is standard practice throughout the global industry to assess the capacity of a structure by using wind load codes and maps. The structural calculations are then governed by the amount of deflection that occurs which is directly related to the wind speed. It is possible, with this real time data, to verify that the structure is serviceable and even to predict other failure modes such as fatigue life.

The bespoke software is designed so that at any point in time, a column's structural integrity and electrical operation can be interrogated, as well as routinely capturing data on a frequency determined by authorised personnel. Certain structural and electrical parameters will be included so that authorised personnel are able to receive a warning if the structure deflects outside the normal operating range.

This can be used to indicate if, for example, a column is involved in a road traffic accident or suffers a catastrophic structural failure or has an electrical or mechanical defect which has resulted in the column becoming unsafe. Additional safety benefits are provided because the relevant authorities are able to respond quickly to a possible obstruction in the road through a warning alert transmitted by the monitoring apparatus, as opposed to waiting to receive a report from a passer by.

The software may also be linked to a Local Authority's Asset Register thereby to provide historical data regarding the structural and electrical outputs from the monitoring method and apparatus of this invention.

The system described is, for example, able to calculate and correlate a 10 minute mean wind speed and 10 minute mean deflection of the structure for comparison against the requirements for some national standards, such as the European standard EN40 for columns.

Similar structural designs in the same or different geographical positions are subject to multiple unique loads. The loads will change in magnitude and or direction due to factors such as: prevailing wind direction, wind velocity, exposure, terrain type and elevation above sea level. This will allow a user to apply a range of loads that can then be used to inform the analytical phase. This 'self-learning system' is used alongside empirical and or physical test data to fine tune the boundaries within the analysis phase. This 'self-learning system' will provide a range of baseline data, for specific structure types, which can be used for comparison in a greatly reduced time period.

Detection of sign/banners (illegally fitted after system initialisation) that increase the surface area of the structure, will also be possible as there will be a change in vibration characteristics, deflection and possible torsion.

The electronic circuit equipment within a lighting column can be severely affected by lightning or electrical switching events. These events have been found to result in increases in voltages (surges or transient over voltages) which can cause irreparable damage to electronic circuit equipment supported by the columns. A Surge Protective Device (SPD) may therefore be provided which is specifically designed to protect the equipment from such events by redirecting the harmful voltage away from the equipment.

Vehicle collision with the structure can be detected via the gyroscope, magnetometer and accelerometer measurements. Also measuring the impact characteristics of structures involved in collisions can be used to improve structure design particularly in the field of passive safety.

Other excitation events such as earthquake detection will result in large accelerations that do not correlate with the wind velocity measurements. Similar measurements from multiple structures in the same geographical area at the same time will indicate such events.

If a light supported by a column is on when it should be off then an alert is sent to inform the column owner Likewise if a light is off when it should be on then an alert can also be sent to inform the column owner.

LED lights include multiple lighting panels which, through continuous monitoring, enable the electrical voltage and current levels to be detected.

Lighting columns generally include an access door behind which a break out switch is located. By continuously monitoring the base compartment door a breach can be detected and an alert sent to the asset owner.

If the microcontroller 10 including the MEMS device is reinstalled onto a different structure type, the firmware can be reconfigured remotely using the over the air communication. Data collection sample rates, accelerometer and gyroscope measurement ranges can all be reconfigured to accommodate the new structure.

The sensor node can be installed in any orientation as the coordinate system will realign to magnetic north using the magnetometer readings giving a calibrated coordinate point for the system.

Analysing the vibration characteristics of the structure will determine damped natural resonant frequencies and monitor any change in those frequencies over time. Power spectral density and FFT methods and autocorrelation techniques are used to determine if the integrity of the structure has changed over time. Predictive tools using neural networks and machine learning will be used to analyse and determine the serviceable life of the structure based on historic data collected via the system.

Torsional forces acting on the structure will be measured utilising the gyroscope readings i.e. angular rate of change.

In summary, using the described system on cantilevered structures provides the following advantages:

Small in size so that surface area and mass elements are negligible in terms of additional load on the structure.

Low in cost to enable mass deployment on low value high risk assets.

Design for a conventional power socket such as a NEMA socket to allow connection of the node to the outside of the lantern while maintaining the connection for CMS or a photocell.

It is to be appreciated that the foregoing is merely indicative of methods and apparatus in accordance with the invention for monitoring the structural health of columns and stocks of columns and that modifications can readily be made thereto without departing from the scope of the invention as described. Thus, whereas the invention has been described with particular reference to lighting columns and stocks of such columns, the invention has equal relevance to other species of columns and column stocks including telecom masts, railway signals, power distribution masts, road signage columns, pylons, support structures for rail electrification equipment, and the like.

The invention claimed is:

1. Apparatus for monitoring the structural health of a column or a stock of columns or a column or columns within that stock, the apparatus comprising:
   a microcontroller located on the or each column and including an integrated micro-electro-mechanical system (MEMS) device programmed to measure and record accelerations, angular velocities, and magnetic field strengths in X, Y, and Z axes;
   means for connecting said microcontroller to a source of power; and
   means operable to transmit said measured data to a central data hub and from there to a remote server for analysis using bespoke software.

2. Apparatus as claimed in claim 1, wherein the integrated MEMS device of the or each microcontroller further comprises a magnetometer function.

3. Apparatus as claimed in claim 1, wherein the means operable to transmit said measured and recorded data to the remote server comprises a WI-FI/RF transmitter or a 3G/4G component.

4. Apparatus as claimed claim 1, wherein the means operable to transmit said measured and recorded data comprises a wireless transmitter connected to receive data from a column mounted global positioning component.

5. Apparatus as claimed in claim 1, wherein the microcontroller also includes an electrical surge protector and photo cell.

6. Apparatus as claimed in claim 5, wherein the photo cell is programmed to detect the presence or lack of daylight in the vicinity of said stock and to switch off/on electrical power to lighting units supported by the column stock depending on whether there is/is not daylight in the vicinity of the stock.

7. Apparatus as claimed in claim 1, wherein anemometers are positioned on an upper surface of the column or each column or a plurality of columns within the stock, the or each such anemometer being connected to enable measurements of wind velocity and direction to be transmitted to the remote server.

8. Apparatus for measuring the structural health and electrical operation of a column or stock of columns and/or columns within that stock, the apparatus comprising a microcontroller including an integrated micro-electro-mechanical system (MEMS) device for location on an upper surface of each or a plurality of columns within the stock to be monitored and connectable to a power supply, each MEMS device comprising accelerometer, gyroscope and magnetometer functions each able to measure and record deflections in X, Y, and Z axes and to transmit recorded data to a column mounted monitor which is, in turn, connected to transmit recorded data to a column mounted wireless transmitter from which the measured data is transmitted to a remote server for analysis using bespoke software.

9. Apparatus as claimed in claim 8, wherein the microcontroller also includes means operable to measure voltage and current parameters of electrical appliances supported by said column or columns within said stock of columns.

10. Apparatus as claimed in claim 8, further including a column mounted global positioning component and/or a real-time clock component.

11. Apparatus as claimed in claim 8, wherein the microcontroller with MEMS device further includes a gyroscope component and/or a power surge protector and/or photo cell.

12. A method of monitoring the structural health of a column or a stock of columns or a column within that stock, the method comprising the steps of:
   locating on the or each said column an integrated micro-electro-mechanical system (MEMS) device programmed to measure and record accelerations, angular velocities, and magnetic field strengths in X, Y, and Z axes;
   transmitting such measured and recorded accelerations, angular velocities, and magnetic field strengths to a central hub and from there to a remote server; and
   analyzing said measured data received by said remote server using bespoke software to alert a user of the method to a fault detected in the or one of the monitored columns.

* * * * *